United States Patent Office 3,411,829
Patented Nov. 19, 1968

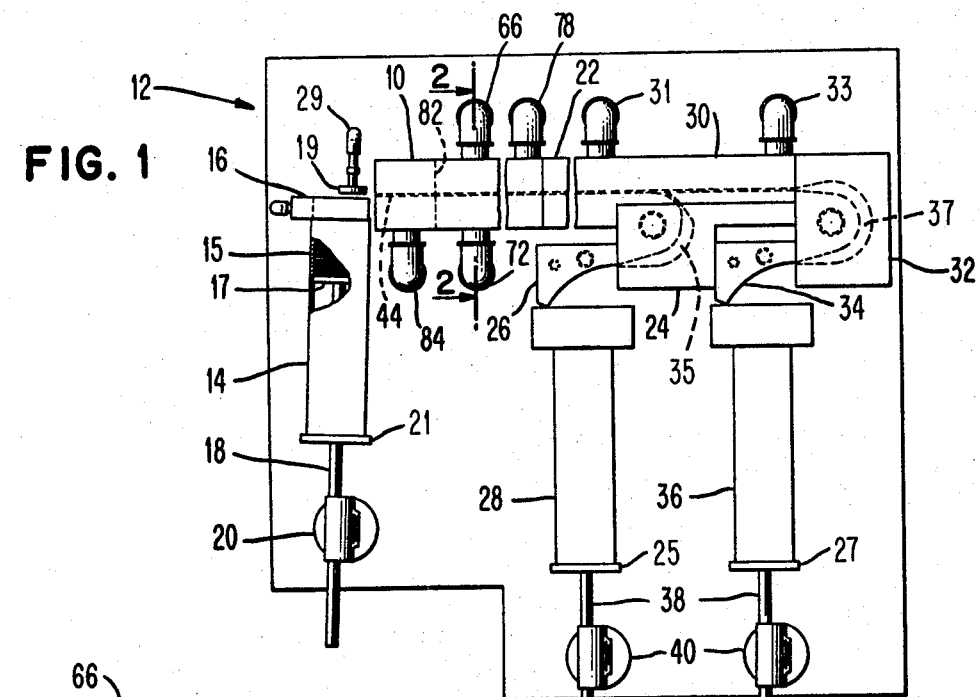
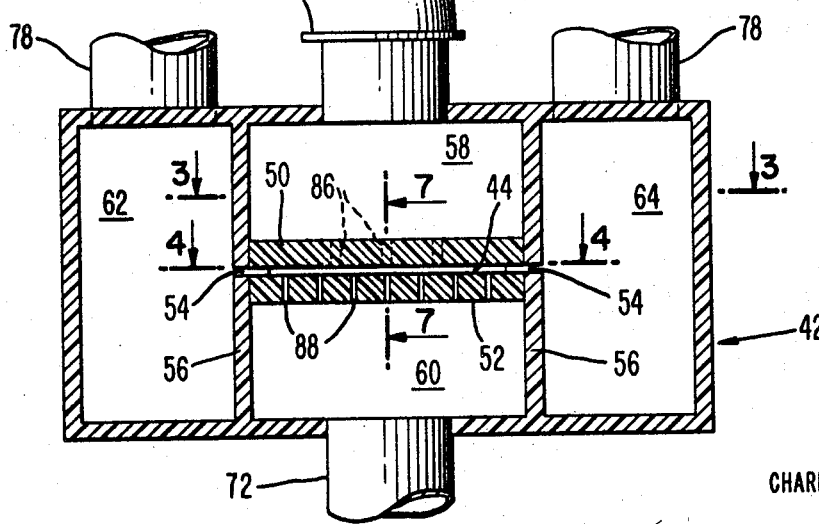

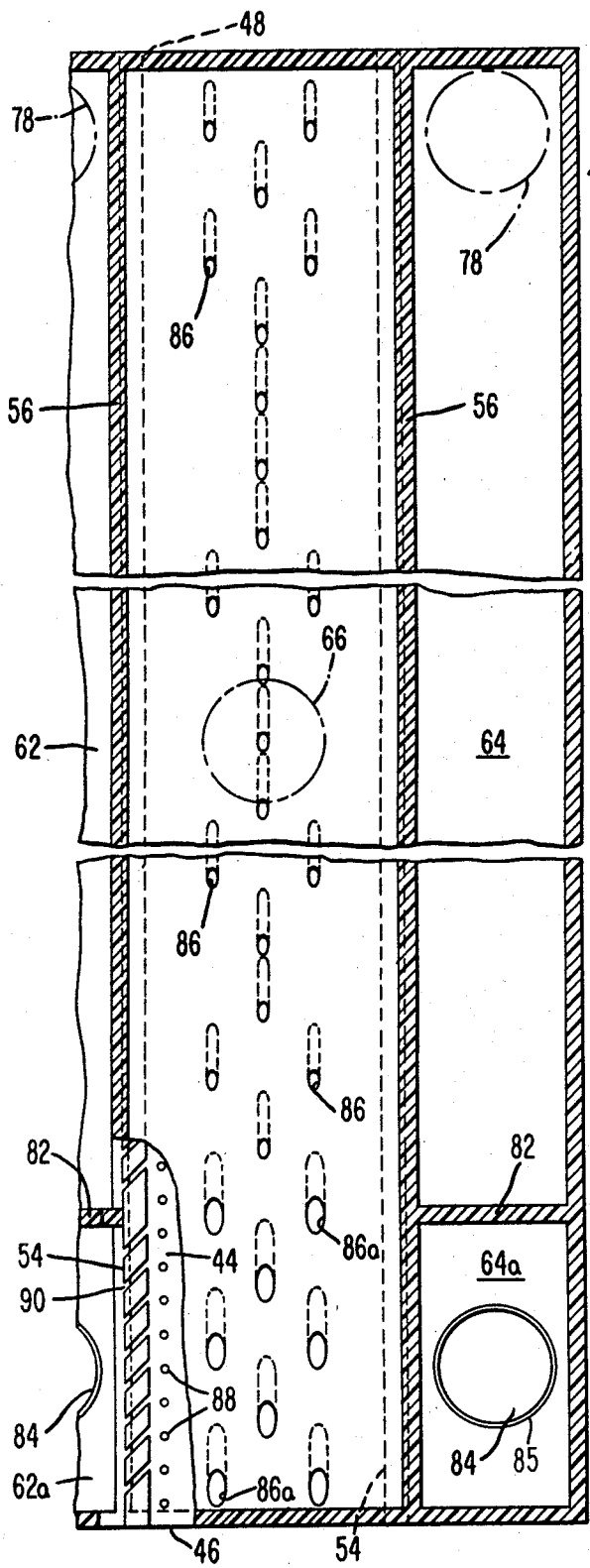
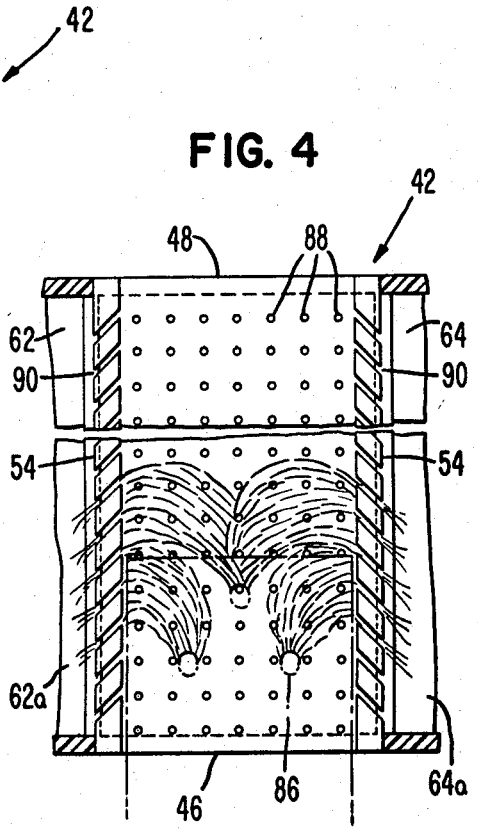
FIG. 3
FIG. 4

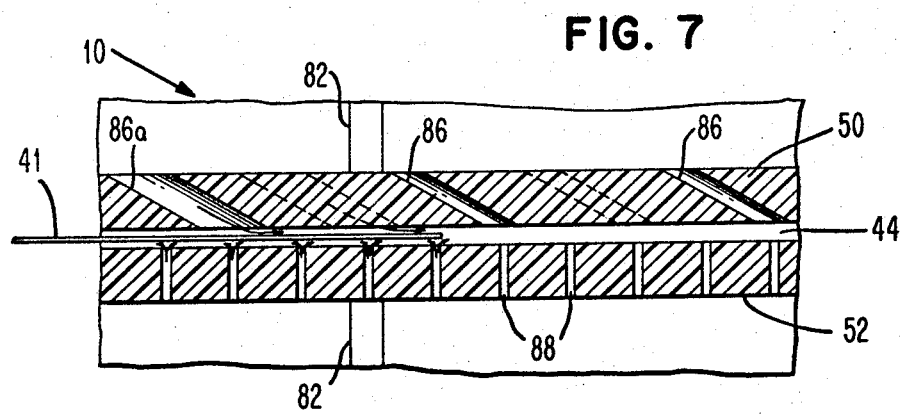
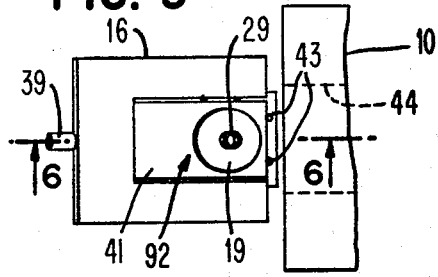
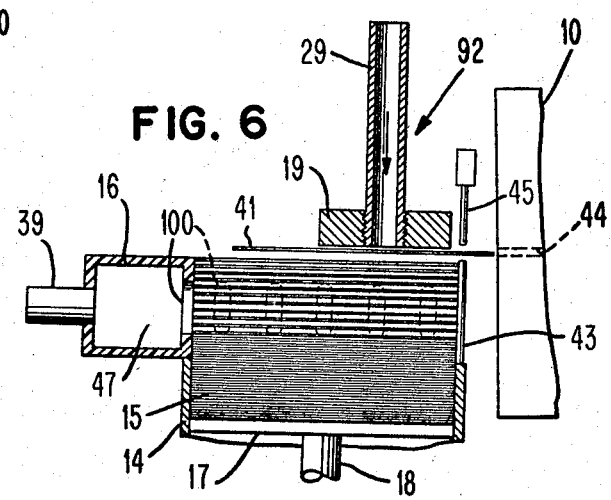
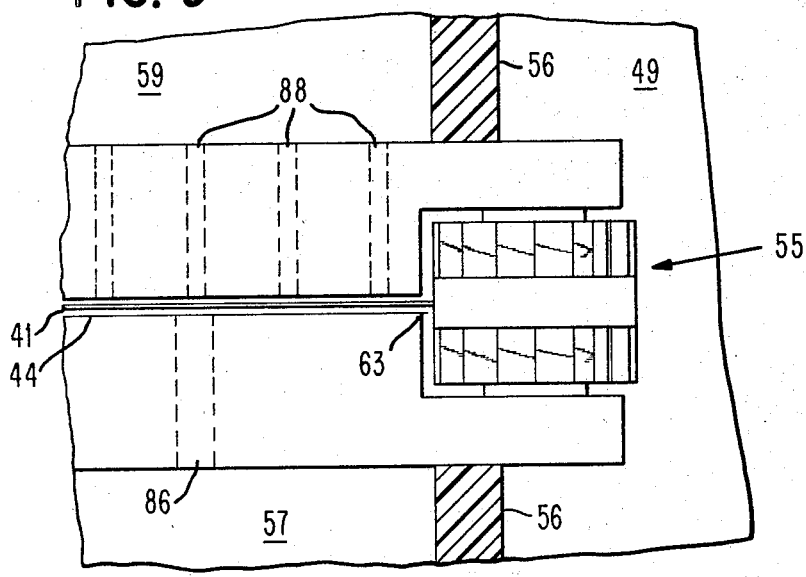

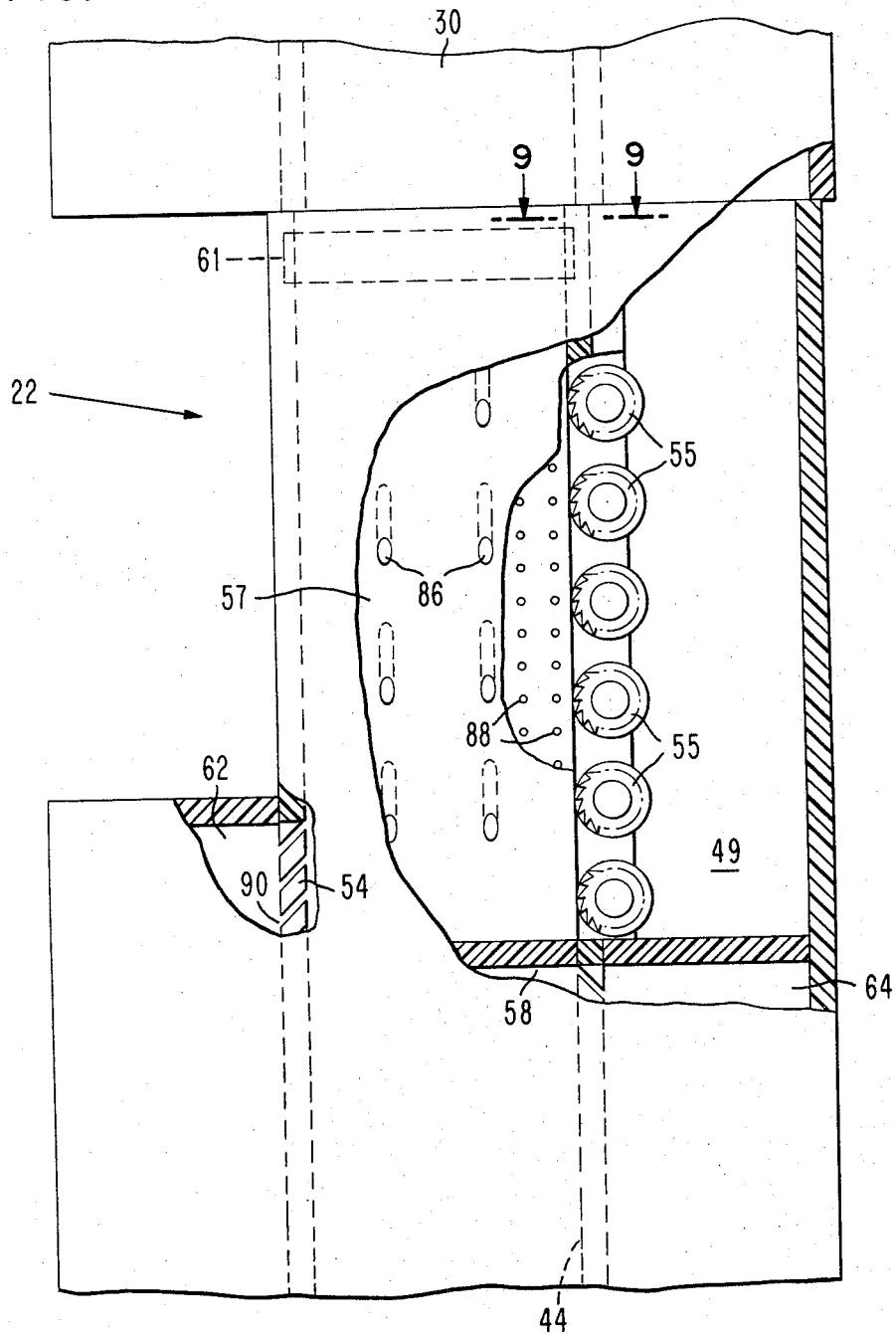

3,411,829
SHEET HANDLING SYSTEM EMPLOYING AN ALL-FLUID TRANSPORT TECHNIQUE
Charles Barton Albright, Norristown, Pa., assignor to Sperry Rand Corporation, New York, N.Y., a corporation of Delaware
Filed Aug. 4, 1966, Ser. No. 570,304
10 Claims. (Cl. 302—29)

ABSTRACT OF THE DISCLOSURE

The present device includes a separator means which directs a vertical jet of air onto the top item of a stack of items and when the stack is moved sufficiently close to the air jet source, the static pressure is instantaneously converted into radial velocity pressure and the top item is snapped upward from the remaining items in the stack. In addition the present system includes a collar-like pre-separator which provides transverse air jets to riffle the top number of items in the stack. Further the present system includes a magazine arrangement which is tilted toward the main passageway of the transport system in order that the force of gravity will help cause the item, which is separated, to move forward into the entrance of the main passageway. The system effects incremental air movement by providing regularly located propulsion jet apertures which are connected to a source of air pressure while at the same time providing regularly located exhaust apertures which are connected to a negative pressure source. Accordingly, as the air enters the passageway under pressure it moves only a predetermined distance before it is taken off by a properly located exhaust aperture and thus any sheet item which is passing along the main passageway is incrementally carried by this air flow. The present system also provides a means to align the sheet items passing therethrough in order that information which is recorded thereon may be read from a reading head and a read station. Finally, the present system provides a means for disposing an item as it passes through the read station in contact proximity with the read head in order to read the information therefrom. Yet another feature that is included in the present system is the selectably operable turnaround station wherein the items are fluid-dynamically intercepted and removed from their excursion through the main passageway, thereafter, literally turned around and finally decelerated to be passed into a stacker device.

This invention relates to a sheet handling system which employs an all-fluid transport technique.

Heretofore, sheet handling systems have employed rollers, carrier belts, chute blades, vacuum lifts, and like mechanical devices which come in physical contact with the sheet items being processed. Such systems have been satisfactory under highly controlled conditions, but unsatisfactory in circumstances of limited control. In other words, such systems have failed to satisfactorily process sheet items which have absorbed moisture (for instance, by human handling), and have experienced periodic item (card) jams. If, for some reasons, the sheet items are delicate, or somewhat small in size, or need to be kept clean or sterile, prior art sheet handling systems, with their capacity of having the hardware come in contact with the items, would not be suitable.

There has been some attempt to process sheet items by pneumatic means in an effort to reduce the problems which art inherent in bringing the items in contact with the hardware of a system. Such schemes have included means for separating the sheet items by developing a pressure differential through the application of a plurality of angularly directed air jets onto the top item of the stack. In addition, these systems have advanced the items in response to the friction force of the air as it passes over the items in the course of developing the pressure differential for lifting, as mentioned above. In such systems there have been problems with the item separating device in that very often more than one sheet items is separated from the stack. To overcome this problem the prior art systems have used stopping means which physically stop and/or separate the items (when more than one item has been removed) after the items have entered the system, to insure that only one item will be processed at a time. Since it has been the pattern to often initially separate from the stack more than one item at a time, the stop and separate routine is a standard operation whether it is needed or not. Obviously, these physical stopper and secondary separator means come in contact with the item. In addition, the prior art systems have programmed (sequentially operated) pressure sources which serve to provide incrementally occasioned jets of air to move the sheet items.

In accordance with the present invention, the sheet items are separated individually without any intermediate stopping means or further separating structure. The sheet items are thereafter transported through the system (and in the instant embodiment information read therefrom), selectively removed from the excursion, and stacked while being in virtually no contact with the hardware of the system.

Accordingly, it is an object of the present invention to provide an improved sheet item handling system.

The present invention features a separator device which driects a vertical jet of air onto the top item of the stack and when the stack is moved sufficiently close to the air jet source the static pressure is instantaneously converted into radial velocity pressure and the top item is snapped upward from the remaining items in the stack. In addition, the system features a collar-like pre-separator which provides transverse air jets to riffle the top number of items in the stack. The system further features a magazine arrangement which is tilted toward the main passageway of the transport system in order that the force of gravity will help to cause the item which is separated to move toward the entrance of the main passageway.

The system generates an incremental air movement by providing regularly located propulsion jet apertures which are connected to a constant source of air pressure while at the same time providing regularly located exhaust apertures which are connected to a constant negative pressure source. With such an arrangement the air which enters the passageway under pressure moves only a predetermined distance before it is taken off by a properly located exhaust aperture, and accordingly, any sheet item which is passing along the main passageway is incrementally carried by this mass air flow.

The present system further features means to align the sheet items passing therethrough in order that information which is recorded on said sheet items may be read from a reading head in a read station. An accompanying feature provides a means for disposing the sheet item as it passes through the read station in contact proximity with a read head in order to read the information therefrom.

Finally the system features selectably operable turnaround stations whereat the sheet items are fluid-dynamically intercepted and removed from their excursion through the main passageway; thereafter, literally turned around; and finally decelerated to be passed into a stacker device.

The present invention can be better understood by considering the following figures in which:

FIGURE 1 is a pictorial schematic of the overall system broken in part;

FIGURE 2 is a sectional view of a portion of FIGURE 1;

FIGURE 3 is a sectional plan view of the transport system;

FIGURE 4 is a schematic view of a portion of the main passageway indicating the air flow therein;

FIGURE 5 is a plan view of the sheet separator station;

FIGURE 6 is a side view of the sheet item separator station;

FIGURE 7 is a sectional view of the entrance portion of the main passageway of the system;

FIGURE 8 is a breakaway schematic showing the alignment station and the alignment turbines therein;

FIGURE 9 is an enlarged view of a turbine within the alignment station;

Figure 10:
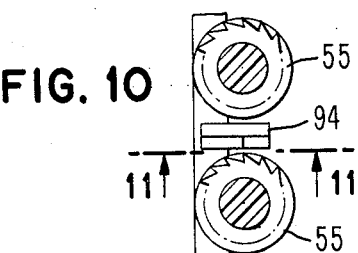
FIGURE 10 is a schematic view of two alignment station turbines with an air separator wedge therebetween.

In general, the present system operates such that unit record sheet items are placed in a magazine to be processed. The magazine includes a pusher means, which constantly pushes the stack toward the upper end thereof, and a separator pressure head located at the upper open end thereof which directs a jet of air substantially vertically onto the uppermost item. When the uppermost item reaches a critical position at which point the static pressure of the vertical air jet is instantaneously converted into radial velocity pressure, the top item is virtually snapped up to within a few thousandths of an inch of the pressure plate which is emitting the vertical air jet. Actually, as the stack of unit record sheet items approaches this critical position, the upper numbers thereof are riffled by transverse air jets which emanate from a pre-separator device that is formed as a collar and secured around the upper portion of the magazine.

As each of the items is snapped up toward the pressure plate, the item finds itself disposed at an angular position toward the main passageway of the transport system. Accordingly, the force of gravity act upon the sheet item which has been so selected and causes it to move into the main passageway. At the same time there are other forces acting upon this selected item; in particular, the transverse air flow from the back end of the collar helps, by a pushing effort, to urge the selected item into the main passageway. In addition the initial portion of the main passageway has exhaust apertures therein which exhaust air therefrom at a relatively high rate, thereby creating a substantial pressure differential between the ambient air and the air within said main passageway. This pressure differential creates a resultant air flow into the main passageway, thus causing the selected sheet item to be carried into this main passageway.

Once a selected item has entered the main passageway it is urged incrementally, by the friction of the air from the angularly projecting air jets (from the top of the main passageway) and by the force of the abutment of these jets upon the end of the item, to be carried along in the mass air flow through the main passageway. In the main passageway there are vertical jets of air on the bottom side of the passageway which act as a bearing means to cushion the selected item as it is urged along during its excursion through the main passageway.

In the present embodiment the selected sheet items are directed to one side of the main passageway by the expedient of simply exhausting the air on that one side and not on the other. As these items approach the one side of the main passageway they encounter rotating turbines which serve to tangentially contact the items and align them for a future reading experience. As the items leave the alignment station they are further moved into a reading station which is so shaped that the item is lifted toward the top thereof to come into contact with a read head means. After having been read by said read head the items continue on the mass air flow excursion as before. In accordance with the information that has been read, the items are selectively removed from the main passageway by providing an air gate means which either allows the item to be directed, or deflected, by one of the angular jet sources into a spur passageway, or causes the item to continue along the main passageway.

In the spur passageway an item is literally turned around so that when it is ultimately decelerated it will be placed into the stack in such a manner that it might be easily reloaded into the magazine. In other words, if the face of the item were toward the upper surface of the main passageway, the face of the item would be now downward toward the stacker. Hence, when the stacker magazine is removed and "flipped over" the items can be entered into the main passageway at the feed-in station with their faces up.

Consider now FIGURE 1. In FIGURE 1 there is depicted the overall system 12. In the separator location there is shown a magazine 14 within which there is depicted a stack of unit record items 15, as seen through the breakaway portion of the magazine. As also can be seen through the breakaway portion, the magazine is equipped with a pusher plate 17. The pusher plate 17 is raised at a constant rate by virtue of the shaft 18 which is connected to a motor through aperture 20. As the pusher plate 17 moves upward the unit record items come within the bay portion of a collar-like device called a pre-separator 16. The pre-separator 16 is U-shaped and as will become more apparent hereinafter actually provides a pair of ledges over which a flange on the magazine 14 is fitted, in order that the magazine can be readily removed from the separator station. In order to remove the magazine, the shaft 18 is fully retracted below the magazine cap 21. The magazine cap 21 fits onto the flange of the magazine and has an associated pusher plate 17 which can be moved up and down the magazine. Each of the magazines come equipped with two caps and therefore two pusher plates which respectively fit into each end of the magazine, the reason for which will become immediately apparent. The same magazines which are used for the feed-in operation are also used for the stacking operation and hence on each of the stacker columns there are shown similar caps 25 and 27. When a stacker magazine has been fully loaded, for instance magazine 28, it is removed and a cap similar to cap 25 is slipped over the flange on the upper end. Thereafter the magazine is turned over, the cap 25 is removed, and the magazine 28 can be inserted in place of the magazine 14. The shaft 18 is aligned to be raised through the hole in the cap 21 (or any similar cap) and fitted into the pusher plate 17.

At the upper end of the magazine 14 there is depicted the pre-separator 16 which is a U-shaped device more completely shown in FIGURES 5 and 6. In FIGURE 1 the separator head 19 is shown located at close proximity to the open end of the magazine 14 over the bay area of the pre-separator 16. Connected to the separator head 19 is an input tube 29 which is connected to the separator head 19 to supply air under pressure thereto, and hence generate an air jet therefrom. Although it is not shown in FIGURE 1, actually there is an adjustment on the upper portion of the head 19 which allows the head to be located in the proper position, with respect to the unit record items.

When a unit record has been lifted from the stack as generally described earlier it is angled toward the accelerator station 10 of the main system. Because the unit record which has been separated is angled toward the accelerator station 10, the force of gravity urges this separated unit record into the entrance of the main passageway 44. In this regard examine FIGURES 3 and 7. In FIGURE 3 there is shown a heavy exhaust chamber, i.e., plenum 64a, from whence the exhaust air tubing 84 is connected through the aperture 85. Along the sides of the main passageway 44 there are apertures, such as aperture 90 shown in FIGURE 3, which are angled back away from the direction that the unit document travels when it is passing through the main passageway. When the main exhaust chamber 64a has a negative pressure developed therein, the air which is fed through the apertures 86a and through the air bearing apertures 88 is exhausted through the apertures 90 into both the chambers 62a and 64a. The air flow path is shown in FIGURE 4.

As can be sen in FIGURE 7, the initial angular propulsion jet apertures are substantially larger than the remaining propulsion apertures as shown by the difference between aperture 86a and aperture 86. Accordingly there is a significant mass air flow developed in the initial part of the accelerator station because the pressure differential between the ambient air and the air in the entrance to chamber 44 is quite pronounced. This arrangement results in a strong urging of the sheet items into the entrance 44, not only by the forces of gravity but by the differential of air pressure which causes an influx of ambient air into the entrance of the chamber.

As can be seen in FIGURE 6, the pre-separator collar has apertures 100, some of which are located at the base of the U-shaped pre-separator. The air flowing from the apertures 100 whose primary purpose is to riffle the cards or sheet items is also passed on into the entrance section of the accelerator. This air flow helps to carry a selected unit record document into the initial portion of the transport system.

Before we proceed with a consideration of the excursion of the unit record in detail, let us consider the remainder of the overall system as depicted in FIGURE 1. Into the accelerator there are connected a pressure inlet tube 66, a pair of exhaust tubes 78 (which are connected as a T and are better depicted in FIGURE 2), and a pressure tube 72. The air supplied by the pressure source through tube 72 provides the vertical jets of air to effect an air bearing as better shown in FIGURE 2, while the air provided through the air pressure tube 66 provides the propulsion jets which effectively move the card along the transport. The air pressure source providing the propulsion jets is greater than the air pressure sources which provide the vertical jets. The exhaust or negative pressure inlet tube 78 is connected into the plenums 62 and 64 which combination acts to exhaust the air from the main transport passageway 44. There is a further air pressure tube 31 connected into the reading and alignment station 22 as well as an exhaust or negative pressure outlet 33 connected into the turnaround section. The pressure tube 31 supplies propulsion air under pressure into the read-alignment station and the turnaround section, while the exhaust line 33 provides the negative pressure effect for these last-mentioned two sections.

A unit record item traveling down the main passageway 44 through the alignment and read station 22 emerges into the turnaround portion of the transport and may well encounter the turnaround section 24 which includes the spur passageway 35. Ultimately, such an item would be led to the decelerator 26 which would slow the item down and deposit it into the magazine 28. If the card or item were not selected, it would travel all the way to the end of the system into the turnaround section 32, through the spur passageway 37 into decelerator 34 and be stacked in the magazine 36. As indicated earlier, the magazines 28 and 36 can be removed, and have caps, similar to caps 25 and 27, slipped over their respective flanges on what appears to be the top portion in the figure. Thereafter the whole magazine would be flipped over and re-inserted into the feed magazine in place of magazine 14.

In FIGURE 2 the plenum arrangement is shown more clearly. In FIGURE 2 there is shown the exhaust plenums 62 and 64 which are exhausted through the tubing 78. The propulsion jet plenum 58 receives air under pressure through the tube 66. The air bearing plenum 60 is supplied air, under pressure, through tube 72. Depicted in FIGURE 2 is the main passageway 44, the upper surface member 50 of the main passageway as well as the lower surface member 52 of the main passageway. Into the upper surface member there are shown (in phantom) the propulsion apertures 86 while in the lower surface member there are shown the air bearing apertures 88.

FIGURE 3 is a plan view of the acceleration station as shown in FIGURE 1 and obviously enlarged. The two first exhaust plenums 62a and 64a are subjected to heavy negative pressure in order to effect a significant differential pressure between the ambient air and the air at the entrance to the main passageway 44. It can be noted in FIGURE 3 that the original propulsion apertures are somewhat larger than the propulsion apertures which follow thereafter and since the identification numerals of FIGURE 3 are the same as that of FIGURES 1 and 2 there need be no further explanation. The acceleration station is more fully explained in my co-pending patent application entitled, "All Fluid Unit Record Accelerator," Ser. No. 570,312, filed Aug. 4, 1966, and assigned to the same assignee as the present invention.

In FIGURE 4 there is depicted the air flow from the propulsion aperture 86 through the exhaust apertures 90 into the negative pressure plenums 62a and 64a. Actually the air flow depicted in FIGURE 4 is a graphic description of the air flow throughout the whole system into each of the exhaust plenums such as 62 and 64 and the others. Such an arrangement effects the incremental mass air flow by which the unit record items are carried through the system.

FIGURE 5 is a plan view of the separator device which has been more fully described in my co-pending application entitled "Sheet Separator," Ser. No. 570,299, filed Aug. 4, 1966 and assigned to the same assignee as the present application. In FIGURE 5 there is shown the pre-separator collar 16 having a bay section 92 which fits over a magazine (not depicted in FIGURE 5) but such as magazine 14 in FIGURE 1. The pressure head 19 is disposed in close proximity to the unit record items such as the top unit record item 41. Air under pressure is fed through the tube 39 into the pre-separator collar 16 and through the apertures 100, as depicted in FIGURE 6, to riffle the top portion of the cards 15 (also as shown in FIGURE 6). In FIGURE 6 the top unit record item is shown advancing out of the magazine location into a more advanced location than shown in FIGURE 5. In FIGURE 6 there are shown two gate pins 43, in between which a matching pin 45 can be moved to stop a card which is leaving the magazine.

It will be noted in FIGURE 6 that the uppermost numbers of the unit record items have been partially separated so that when the static pressure of the air jet coming through the tube 29 is instantaneously converted into radial velocity pressure, the unit record 41 is easily snapped to within a few thousandths of the pressure head 19. As described in my above-mentioned co-pending patent application, entitled "Sheet Separator," the pressure head 19 is of sufficient thickness so that there is no secondary air movement to lift the second unit record until it is subjected to the full impact of the vertical jet of air.

FIGURE 7 is self-explanatory showing the item 41 entering the initial acceleration chamber and being subjected to the air flow and the air bearing action upon its surfaces.

FIGURE 8 shows a plan view of a telescoped alignment and read station. As the card is transported down the main passageway 44 and it approaches the alignment and read station 22, the negative pressure chamber is only effective on the right-hand side (as FIGURE 8 is viewed). In other words, the negative pressure developed through the tube 33 in FIGURE 1 is applied to the plenum 49 so that now the air flow from the propulsion jets 86 and the air bearing jets 88 is only drawn to the right-hand side of the path. Accordingly, the unit record item is moved to the right-hand portion of the path and comes in contact with the turbines 55. The alignment station details are more fully described in my co-pending patent application entitled "Sheet Item Alignment Device For Sheet Handling System," Ser. No. 570,298, filed Aug. 4, 1966 and assigned to the same assignee of the present application. The turbines 55 are more fully depicted in FIGURE 9. As the air is passed through the chamber 44 it impinges upon the vanes of the turbines 55 and causes them to rotate at a speed which is commensurate with the unit record traveling through the main passageway 44. The turbines 55 are mounted on virtually frictionless bearings and in such a way that the card 41 only comes in contact, tangentially, with the turbine 55 at the point 63 as shown in FIGURE 9. The air pressure chambers 57 and 59 are fed air under pressure from the lead-in tube 31 which is depicted in FIGURE 1. In this way the card 41 is aligned so that it can be properly read in the read station.

Figure 11:
FIGURE 11 is a side view of an air separator wedge.

FIGURE 10 shows a second embodiment of the turbine structure. In between the turbines 55, there is located an air separator 94. FIGURE 11 shows a side view of the separator 94. As the air leaves the main passageway it is separated by the ramp of the separator and shunted to a level of the vanes of the turbines. Accordingly it strikes the vanes and adds to the force driving the turbines.

Figure 12:
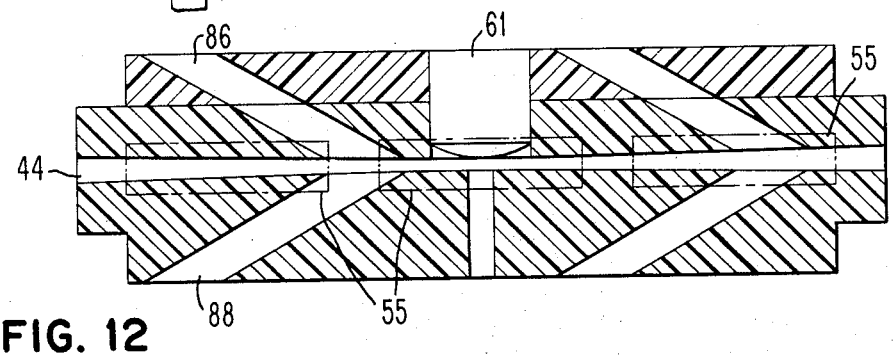
FIGURE 12 is a schematic side view of the reading station within the main passageway.

FIGURE 12 depicts the read station which is actually a part of the alignment section. As is shown in phantom in FIGURE 12 the turbines are mounted along the right-hand side of the read station so that a unit record is continually held in proper alignment as it passes through the read station.

Now it will be noted in FIGURE 12 that the main passageway 44 becomes somewhat narrow in the region of the read head 61. The main passageway 44 returns to its normal width beyond the region of the read head 61. In the read station the air bearing apertures no longer are simply vertical but also assume an angle to provide a propulsion factor for the unit record as it passes through the narrow chamber. In the preferred embodiment the narrow section under the read head is about 50 thousandths of an inch. Since the card, or the unit record item, goes through the narrow section of the read station and actually comes in contact with the read head it enables the read head to read the magnetic markings thereon. Obviously other forms of readers could be used, for instance, an optical reader in which case the narrowness of the gap may not be so critical or may not even be necessary. In the preferred embodiment the consideration is for items which would be handled a great deal, and hence a magnetic read operation is preferred since magnetically inked data are preferred in a situation where the records themselves might be soiled by dirt.

When the unit record item leaves the alignment and read station 22 and enters the turnaround section 30, the entire transport means is found to be relocated so that the unit record is once again floating in the center of the main passageway 44. This is depicted in part in FIGURE 8.

Figure 13:
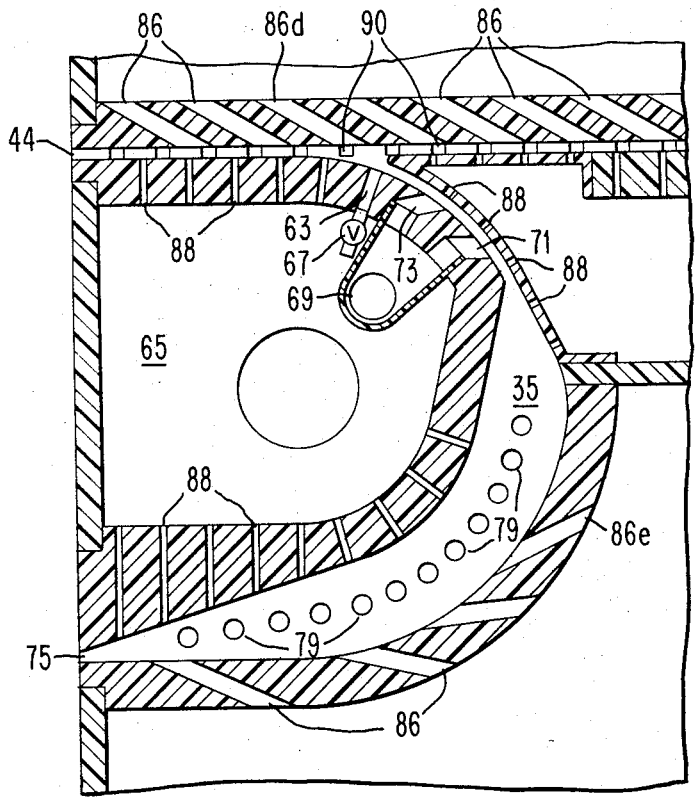
FIGURE 13 is a schematic view of a selectably operable turnaround station as it is connected into the main passageway.

Consider now FIGURE 13 which shows the selectable turn-around station which is similar to the one depicted as turnaround station 24 in FIGURE 1. As the unit record item travels along the main passageway 44 its leading edge comes under the position opposite the propulsion jet 86d. If at the time the leading edge is under the propulsion jet 86d, the selectable jet 63 is not emitting a jet of air, then the leading edge of the unit record will be deflected into the spur passageway 35. Normally all of the apertures 88 leading from the air bearing plenum 65 would be continually providing air jets under pressure. However, in the case of the aperture 63 it is controlled by a suitable valve means 65 which can be either fluid controlled or electrically controlled. The information which is read from the unit record controls the system to provide a jet through the aperture 63 when a unit record is to be sent on to some other selection positions, or no air jet when it is to be selected into the spur passageway 35. Further, in the chamber 69 there is provided a propulsion air chamber, (i.e., air under propulsion pressure), to be transmitted from the two propulsion apertures 71 and 73. The operation of this type of turnaround mechanism is more fully described in my above-mention co-pending application entitled "Sheet Item Turnaround Device for a Sheet Handling System."

As the unit record comes into the lower portion of the turnaround chamber the propulsion jets such as propulsion jet 86e urge the unit record along until it is discharged from the turnaround exit 75.

Figure 14:
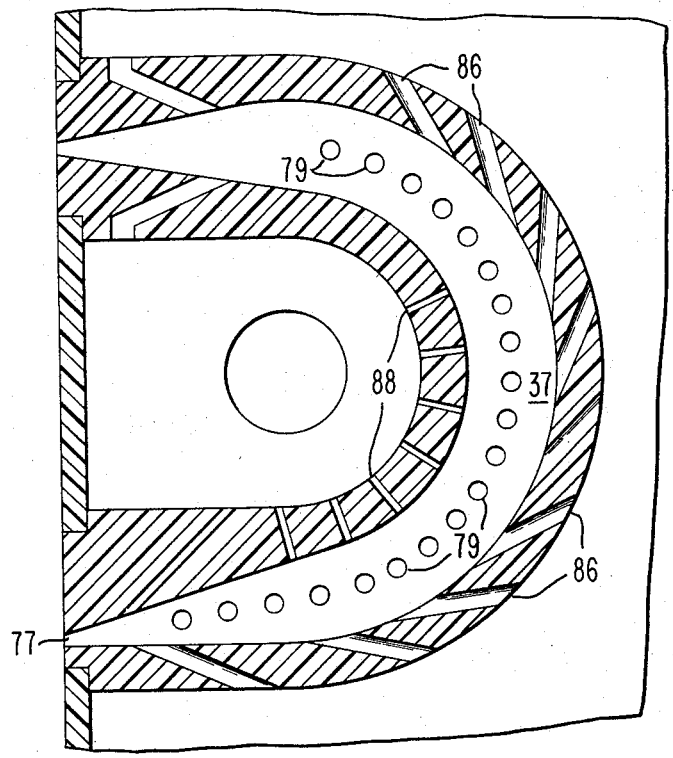
FIGURE 14 is a second embodiment of a turnaround station which may be employed as the last turnaround station in this system.
Figure 15:
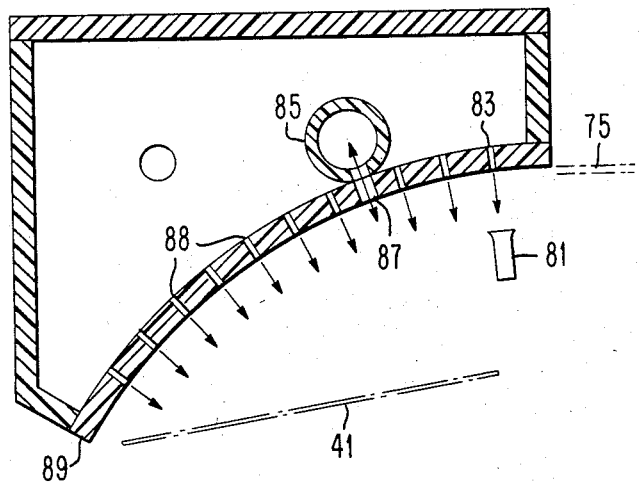
FIGURE 15 is a schematic diagram of a deceleration station as employed with the stacker.

In FIGURE 14 there is shown another turnaround station which is analogous to the turnaround station 32 in FIGURE 1. There is no selection in the turnaround station in FIGURE 12, and the unit record item simply comes into the turnaround station and is transported to the exit 77. The exhaust apertures 79 in each of the turnaround stations simply exhaust the air to the atmosphere.

Finally, in FIGURE 13 there is depicted the deceleration chamber which slows the unit record down and positions it for stacking unit items in the stacking machine. As the card comes into the entrance 75 which is the exit position of the turnaround chamber it passes over a fluid control device 81. Such a fluid control device is simply sensitive to the air jet from the aperture 83. The fluid control device 81 can be a device of the kind described in U.S. Patent No. 3,270,960 or it can be any similar fluid device which simply records the presence or absence of a jet of air. Thus when the air jet from aperture 83 is interrupted and then no longer interrupted (in effect a trailing edge detection) the fluid control device causes the valve 85 to be switched. While the unit record is passing along the arcuate portion of the deceleration chamber the air bearing jets 88 are holding the unit record away from coming in contact with the chamber, while the valve 85 is switched to its negative pressure position, thereby effecting a sucking phenomenon on the unit record and hence slowing it down. When the trailing edge is detected the valve 85 is switched to provide a propulsion jet from the aperture 87 thereby in effect partially rotating the slowed down unit record in a clockwise position around an imaginary fulcrum located at the end 89 of the deceleration chamber. This is not to say that the fulcrum actually would be at point 89, but only in that direction. Accordingly, the unit record is pushed into a stacking position in the stacking magazine, which magazine could be either 28 or 36 as shown in FIGURE 1.

The present invention provides a system for transporting sheet items, by an all fluid technique, through a sheet item processing device. The present system enables the sheet items to have information read therefrom and to be selected and removed from the system in response to said selection.

The embodiment of the invention in which an exclusive property or privilege is claimed are defined as follows:

1. A sheet item processing system which employs an all fluid technique comprising in combination:
  (a) feed-in means to hold sheet items to be processed said feed-in means having an open end;
  (b) sheet item separator means disposed in close proximity to said open end of said feed-in means;
  (c) fluid transport means disposed adjacent to said sheet item separator means to accept sheet items therefrom and transport them therethrough, said fluid transport means having air pressure means, air exhaust means, and air mass flow means;

(d) said air mass flow means having a plurality of apertures angularly disposed to provide jets of air directed toward the movement of items passing through said fluid transport means;

(e) said air exhaust means located along the entire length of said fluid transport means and formed to incrementally exhaust the air from the air jets so that the full impact of each successive air jet is felt on the item passing through said fluid transport means;

(f) said air mass flow means connected to said air pressure means and said air exhaust means to create said effect; and (g) selectable sheet item interception means connected to said fluid transport means to selectively divert said air mass flow to cause a selected sheet item to be removed from said fluid transport means.

2. A sheet item processing system according to claim 1 wherein said feed-in means includes a magazine formed to hold said sheet items and a pusher means disposed within magazine to move said sheet items toward said sheet item separator means.

3. A sheet item processing system according to claim 1 wherein said sheet item separator means includes means to provide a vertical jet of air which is directed to impinge upon the closest sheet item in said feed-in means whereby the static pressure of said vertical jet is converted to radial velocity pressure thereby creating a differential of pressure to lift said closest sheet item toward said separator means.

4. A sheet item processing system according to claim 1 wherein said sheet item separator means includes a pre-separator means which riffles the group of sheet items closest to said open end to facilitate the separation thereof.

5. A sheet item processing system according to claim 1 wherein said air mass flow means includes a main passageway having an upper wall, a lower wall, and two side walls, and herein there is a plurality of angularly disposed apertures through said upper wall which is connected to said air pressure means to generate a plurality of propulsion jets of air, and wherein there is a plurality of substantially vertically disposed apertures through said lower wall which is connected to said air pressure means to generate a plurality of air bearing jets, and wherein each of said side walls has apertures therethrough which are connected to said exhaust air pressure means, all of said apertures acting to effect an incremental air mass flow through said fluid transport means.

6. A sheet item processing means according to claim 1 wherein said fluid transport means includes reading means to read information from sheet items passing therethrough.

7. A sheet item processing system according to claim 6 wherein the air mass flow section of said fluid transport means lying adjacent to said reading means has a passageway which is formed to enable the air mass flowing therethrough to lift a sheet item carried thereby to come into contact proximity with said reading means.

8. A sheet item processing system according to claim 1 wherein there is further included a deceleration means connected to said selectable sheet item interceping means which acts to slow down a sheet item exiting from said selectable sheet item intercepting means while employing an all fluid technique and to further act to manipulate said slowed-down sheet item means into a stacked position with other similar sheet item means.

9. A sheet item processing system according to claim 8 wherein said deceleration means includes a trailing edge detector, an aperture means for providing a suction and a blowing phenomenon in said deceleration means and a valve means connected to said last mentioned aperture which is controlled by said trailing edge detector such that prior to the detection of said trailing edge said suction phenomenon is generated with respect to a sheet item passing in close proximity to said aperture and at the detection of the trailing edge of said last-mentioned sheet item a blowing phenomenon is generated and applied thereto.

10. A sheet item processing system according to claim 1 wherein said selectable item intercepting means includes a plurality of turnaround chambers, at least one of which has a controllable air jet generator disposed to block the entrance of a sheet item into at least one of said turnaround chambers, and alternatively to permit a selected sheet item to enter said at least one turnaround chamber in order to effect said interception.

References Cited

UNITED STATES PATENTS

| | | | |
|---|---|---|---|
| 2,805,898 | 9/1957 | Willis | 302—29 |
| 2,848,820 | 8/1958 | Wallin | 302—29 |
| 3,168,307 | 2/1965 | Walton | 271—26 |
| 3,236,517 | 2/1966 | Lyman | 271—11 |

RICHARD E. AEGERTER, *Primary Examiner.*